United States Patent
Endo et al.

(10) Patent No.: US 12,174,427 B2
(45) Date of Patent: Dec. 24, 2024

(54) OPTICAL DEVICE

(71) Applicant: Nippon Telegraph and Telephone Corporation, Tokyo (JP)

(72) Inventors: Jun Endo, Tokyo (JP); Norio Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 238 days.

(21) Appl. No.: 17/774,980

(22) PCT Filed: Nov. 13, 2019

(86) PCT No.: PCT/JP2019/044532
§ 371 (c)(1),
(2) Date: May 6, 2022

(87) PCT Pub. No.: WO2021/095164
PCT Pub. Date: May 20, 2021

(65) Prior Publication Data
US 2022/0390679 A1   Dec. 8, 2022

(51) Int. Cl.
*G02B 6/32*   (2006.01)
(52) U.S. Cl.
CPC ..................... *G02B 6/32* (2013.01)
(58) Field of Classification Search
None
See application file for complete search history.

(56) References Cited

U.S. PATENT DOCUMENTS

| | | | | |
|---|---|---|---|---|
| 2,131,738 | A * | 10/1938 | Hoyt | G01V 7/08 356/138 |
| 4,493,212 | A * | 1/1985 | Nelson | G01D 5/268 250/231.19 |
| 6,868,736 | B2 * | 3/2005 | Sawatari | G01L 9/0047 73/800 |
| 2001/0055448 | A1 * | 12/2001 | Sato | G02B 6/3807 385/53 |
| 2002/0093998 | A1 | 7/2002 | Kimura et al. | |
| 2003/0152327 | A1 * | 8/2003 | Tanaka | G02B 6/2937 385/75 |
| 2003/0159518 | A1 * | 8/2003 | Sawatari | G01L 9/0047 73/705 |

(Continued)

FOREIGN PATENT DOCUMENTS

| | | | |
|---|---|---|---|
| JP | H05113518 A | 5/1993 | |
| JP | H0933761 A | 2/1997 | |

(Continued)

*Primary Examiner* — Jerry Rahll
(74) *Attorney, Agent, or Firm* — Slater Matsil, LLP (57) ABSTRACT

A device includes a first lens), a second lens, and an adjustment platform. The first lens is arranged between a first end surface and a second end surface, and enlarges the mode field diameter of light that is guided through a first optical waveguide and is emitted from the first end surface. The second lens is arranged between the first lens and a second end surface, and collects light that has passed through the first lens. The first lens is mounted on the adjustment platform. The distance between the optical axis of the first optical waveguide and the principal point of the first lens is adjusted on a plane orthogonal to the optical axis of the first optical waveguide using the adjustment platform.

17 Claims, 9 Drawing Sheets

(56) References Cited

U.S. PATENT DOCUMENTS

| | | | | |
|---|---|---|---|---|
| 2009/0110347 A1* | 4/2009 | Jacobsson | ............... | G02B 6/32 |
| | | | | 385/74 |
| 2017/0184794 A1* | 6/2017 | Suzuki | ................ | G02B 6/4292 |
| 2022/0057580 A1* | 2/2022 | Endo | ..................... | G02B 6/325 |

FOREIGN PATENT DOCUMENTS

| JP | 2002141607 A | 5/2002 |
|---|---|---|
| JP | 2008250050 A | 10/2008 |
| JP | 2008250051 A | 10/2008 |
| JP | 2017134225 A | 8/2017 |
| JP | 6539216 B2 | 7/2019 |

* cited by examiner

OPTICAL DEVICE

CROSS-REFERENCE TO RELATED APPLICATIONS

This application is a national phase entry of PCT Application No. PCT/JP2019/044532, filed on Nov. 13, 2019, which application is hereby incorporated herein by reference.

TECHNICAL FIELD

The present invention relates to an optical device, and in particular to an optical device that converts a mode field diameter of light to connect two optical waveguides.

BACKGROUND

There has been demand for an optical connection technique for efficiently coupling (optically connecting) optical waveguides. For example, there has been demand for a technique for highly efficient optical connection between a compound-based semiconductor optical device or a silicon (Si) optical waveguide included in silicon photonics serving as a light source for communication, and an optical fiber, a planar light wave circuit (PLC), or the like.

In the optical connection as described above, the mode field diameter of the light in each optical waveguide is significantly different. For this reason, a structure for converting the mode field diameter of light, such as a tapered structure or a grating structure, is used in the optical connection therebetween. However, the efficiency of the optical connection (coupling efficiency) may deteriorate due to variations in the production of the structure for converting the mode field diameter. In order to suppress this deterioration, a technique is used in which a lens optical system is formed within the range of constraint of the optical path length and the coupling efficiency is compensated.

There are various modes of the lens optical system for compensating the above-described coupling efficiency. An optical system using a single lens has a simple alignment step and is used from the viewpoint of cost reduction. However, in an optical system using a single lens, there is a problem with return light, and it is not easy to add various functions such as wavelength selection.

Figure 17:
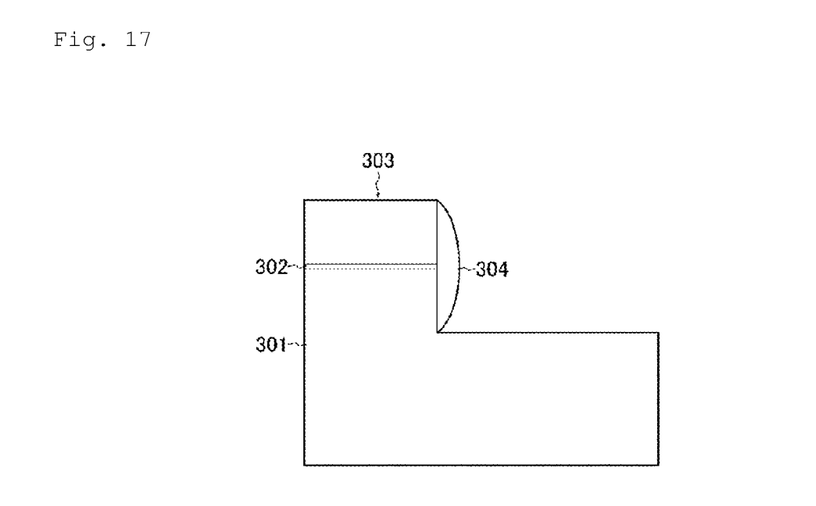
FIG. 17 is a configuration diagram showing a configuration of an optical device in which an optical waveguide 303 and a lens 304 are formed in one piece.

In contrast, by using an optical system with two lenses, it is possible to obtain functions such as suppression of return light and wavelength selection. For example, a collimation system using two lenses is formed between optical waveguides that are optical connection targets, and an isolator and a filter are arranged therebetween. However, in such an optical system using two lenses, the number of alignment steps increases as compared with the single lens system, and the manufacturing cost increases. For this reason, as shown in FIG. 17, a structure has been proposed in which an optical waveguide 303 constituted by cladding 301 and a core 302, and a lens 304 are formed in one piece and thereby the number of alignment steps between the lens and the optical waveguide is reduced (see PTL 1).

CITATION LIST

Patent Literature

[PTL 1] Japanese Patent No. 6539216.

SUMMARY

Technical Problem

However, in the technique of forming the lens and the optical waveguide in one piece, there is a problem in that it is difficult to match the principal point of the lens with the optical axis of the optical waveguide, and the coupling efficiency decreases in correspondence with the amount of deviation therebetween. As described above, if a plurality of lenses are used in the optical system for compensating the coupling efficiency, there is a problem in that the deterioration of the coupling efficiency cannot really be compensated due to the decrease in the coupling efficiency resulting from the above-described matter.

Embodiments of the present invention were made to solve the above problems, and an object of embodiments of the present invention is to enable suppression of a decrease in coupling efficiency in an optical system using a plurality of lenses.

Means for Solving the Problem

An optical device according to embodiments of the present invention includes: a first lens that is arranged between a first end surface through which light of a first optical waveguide that is one connection target enters and exits, and a second end surface that faces the first surface and through which light of a second optical waveguide that is another connection target enters and exits, the first lens being configured to enlarge a diameter of a mode field of light that is guided through the first optical waveguide and is emitted from the first end surface; a second lens that is arranged between the first lens and the second end surface and is configured to collect light that has passed through the first lens; an adjustment platform on which the first lens is mounted and which is for adjusting a distance between an optical axis of the first optical waveguide and a principal point of the first lens on a plane orthogonal to the optical axis of the first optical waveguide; and a support portion for supporting the second lens on the second end surface side of the second optical waveguide.

Effects of embodiments of the Invention

As described above, according to embodiments of the present invention, the adjustment platform on which the first lens is mounted and which is for adjusting the distance between the optical axis of the first optical waveguide and the principal point of the first lens on a plane orthogonal to the optical axis of the first optical waveguide is included, and therefore it is possible to suppress a decrease in coupling efficiency in an optical system using a plurality of lenses.

DETAILED DESCRIPTION OF ILLUSTRATIVE EMBODIMENTS

Hereinafter, an optical device according to an embodiment of the present invention will be described.

Embodiment 1

Figure 1:
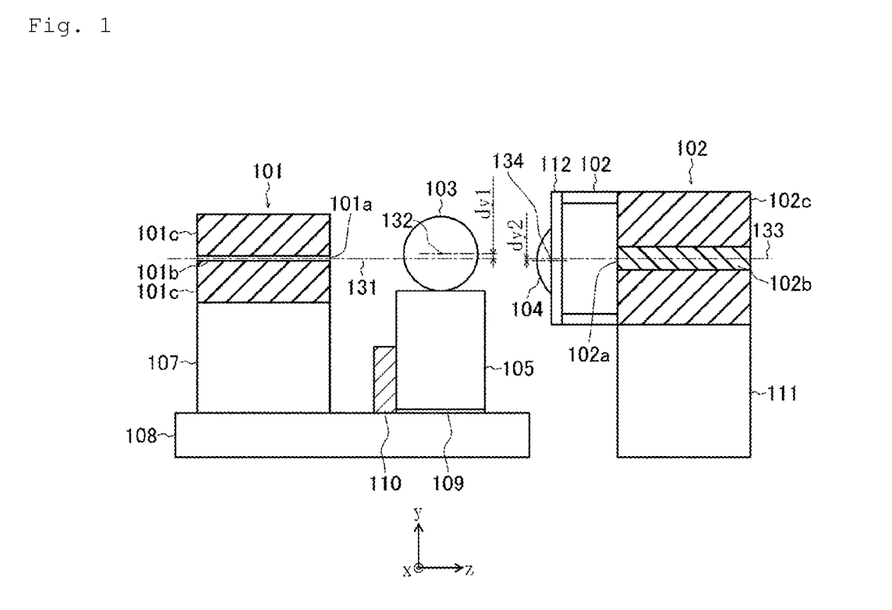
FIG. 1 is a cross-sectional view showing a configuration of an optical device according to a first embodiment of the present invention.
Figure 2:
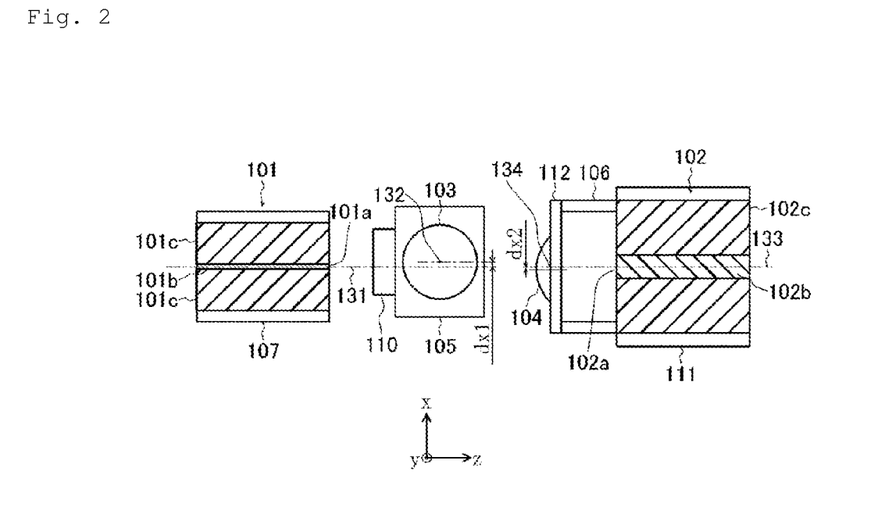
FIG. 2 is a cross-sectional view showing a configuration of the optical device according to the first embodiment of the present invention.

First, an optical device according to a first embodiment of the present invention will be described with reference to FIGS. 1 and 2.

This optical device is a device that optically connects (couples) a first optical waveguide 101 having a first end surface 101a through which light enters and exits and a second optical waveguide 102 having a second end surface 102a through which light enters and exits. Note that the second end surface iota is arranged so as to face the first end surface 101a. For example, the first optical waveguide 101 and the second optical waveguide 102 are arranged such that the optical axis 131 of the first optical waveguide 101 and the optical axis 133 of the second optical waveguide 102 substantially match each other.

The first optical waveguide 101 is, for example, a so-called silicon optical waveguide constituted by a core 101b made of Si and cladding low made of silicon oxide. The second optical waveguide 102 is a so-called optical fiber constituted by a quartz-based core 102b and cladding 102c.

The optical device includes a first lens 103, a second lens 104, and an adjustment platform 105.

The first lens 103 is arranged between the first end surface 101a and the second end surface 102a, and enlarges the diameter of the mode field of the light that is guided through the first optical waveguide 101 and is emitted from the first end surface um. The first lens 103 is, for example, a spherical (spherically symmetrical) ball lens. The first lens 103 is made of, for example, a quartz-based material.

The second lens 104 is arranged between the first lens 103 and the second end surface 102a, and collects the light that has passed through the first lens 103. The second lens 104 collects the light that has passed through the first lens 103 in order to couple the light that is guided through the first optical waveguide 101 and is emitted from the first end surface 101a to the second optical waveguide 102 at the second end surface 102a. The second lens 104 is, for example, a convex lens having a refracting surface (e.g., an ellipsoidal surface) that is convex toward the first end surface 101a. Note that the second optical waveguide 102 is mounted (fixed) on a mounting platform 111. The mounting platform 111 is made of, for example, glass.

Here, the second lens 104 is supported by and fixed to the second end surface 102a side of the second optical waveguide 102 by the support portion 106. The support portion 106 is made of, for example, a resin such as plastic. Note that in this example, the second lens 104 is formed on a plate-shaped or sheet-shaped support plate 112, and is fixed to the support portion 106 via the support plate 112. The support plate 112 can be made of the same resin as the support portion 106.

The first lens 103 is mounted on (fixed to) the adjustment platform 105. Also, the distance between the optical axis 131 of the first optical waveguide 101 and the principal point 132 of the first lens 103 is adjusted on a plane perpendicular to the optical axis 131 of the first optical waveguide 101 using the adjustment platform 105. The adjustment platform 105 is made of, for example, the same quartz-based material as the first lens 103. For example, the adjustment platform 105 is fixed by an adhesive layer 109 on a substrate 108 on which a mounting platform 107 is fixed, the first optical waveguide 101 being mounted on the mounting platform 107. The mounting platform 107 can be made of, for example, Si. By adjusting the position of the adjustment platform 105 according to the thickness of the adhesive layer 109, the distance between the optical axis 131 and the principal point 132 can be adjusted. Also, movement of the adjustment platform 105 in the optical axis direction is restricted by a stopping member 110.

In the first embodiment, a decrease in coupling efficiency in the optical system resulting from deviation of the second lens 104 that is fixed to and arranged on the second optical waveguide 102 can be suppressed by adjusting the position of the first lens 103 using the adjustment platform 105.

Hereinafter, suppression of a decrease in coupling efficiency in the optical system, which is achieved by adjusting the position of the first lens 103 described above, will be described in more detail. First, a result of calculating the optical path of the optical device according to the first embodiment will be described. Hereinafter, the distance between the optical axis 131 of the first optical waveguide 101 and the principal point 132 of the first lens 103 is d1, and the distance between the optical axis 133 of the second optical waveguide 102 and the principal point 134 of the second lens 104 is d2. Here, the x-coordinate component of the distance d1 is dx1, and the y-coordinate component is dy1. Also, the x-coordinate component of the distance d2 is dx2, and the y-coordinate component is dy2.

Figure 3:
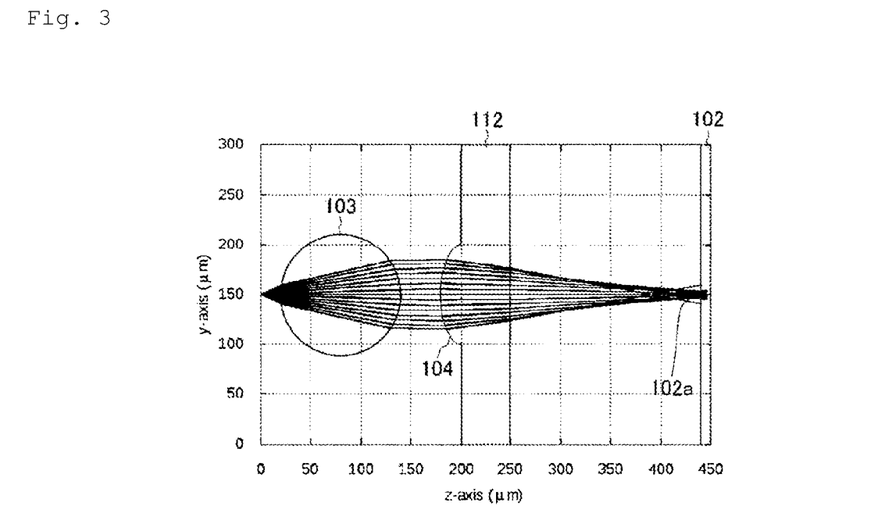
FIG. 3 is a characteristic diagram showing a result of calculating an optical path obtained when the principal point of the lens of the optical device according to the first embodiment is located on an optical axis of an optical waveguide.

FIG. 3 shows the result of calculating the optical path obtained when the principal point of the lens is located on the optical axis of the optical waveguide. More specifically, this is a case in which the optical axis 131 of the core 101b of the first optical waveguide 101 and the optical axis 133 of the core 102b of the second optical waveguide 102 are coaxial, and the principal point 132 of the first lens 103 and the principal point 134 of the second lens 104 are located on the above-described optical axis.

Note that the first optical waveguide 101 has a reverse tapered structure in which the cross-sectional area of the core 101b decreases in the propagation (guiding) direction, and the mode field diameter of the guided light is converted such that the numerical aperture of the emitted light is about 0.3 or less. As long as the above-described numerical aperture does not exceed 0.3, a tapered structure need not be formed. The optical path calculation was performed using a ray tracing method with a numerical aperture of about 0.4 (corresponding to a total radiation angle of 50 degrees). The incident end surface of the second optical waveguide 102 is defined as an image plane. The diameter of the core 102b, of the second optical waveguide 102 is 10 μm.

Figure 4:
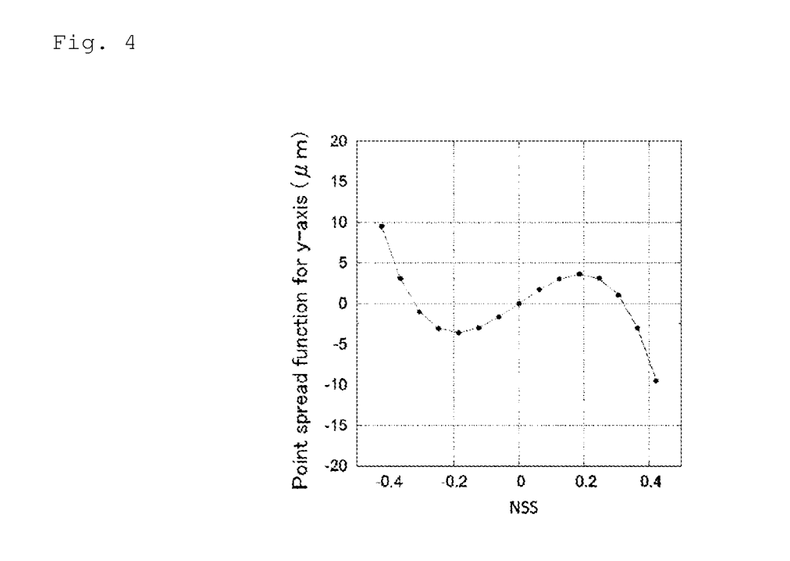
FIG. 4 is a characteristic diagram showing the result of plotting a y-coordinate (vertical axis) of an intersection point (point image position) of a light ray and an image plane with respect to a product NSS (n1·sin(θs)) (horizontal axis) of the sine (sin(θs)) of an angle θs formed by the emitted light ray on the light source side and an optical axis 131 and a refractive index n1 between a first optical waveguide 101 and a first lens 103.

FIG. 4 shows the result of plotting the y-coordinate (vertical axis) of the intersection point (point image position) between the light ray and the image plane with respect to the product NSS (n1·sin(θs)) (horizontal axis) of the sine (sin(θs)) of the angle θs formed by the emitted light ray on the light source side and the optical axis 131 and the refractive index n1 between the first optical waveguide 101 and the first lens 103. As a result, it can be understood that if the principal point of the lens is located on the optical axis of the optical waveguide, emitted light having an NSS of about −0.35 to 0.35 will be incident on the plane of the core 102b of the second optical waveguide 102.

Also, in order for the incident light to propagate through the second optical waveguide 102, the product NSR (n2·sin(θr)) of the sine (sin(θr)) of the angle θr formed by the incident light beam on the second end surface 102a of the second optical waveguide 102 and the optical axis 133 and the refractive index n2 between the second optical waveguide 102 and the second lens 104 needs to satisfy a value determined by the structure of the second optical waveguide 102. Or, which corresponds to the maximum value of the NSR at which light can propagate through the second optical waveguide 102 is called the maximum light receiving angle $\theta_{max}$.

Figure 5:
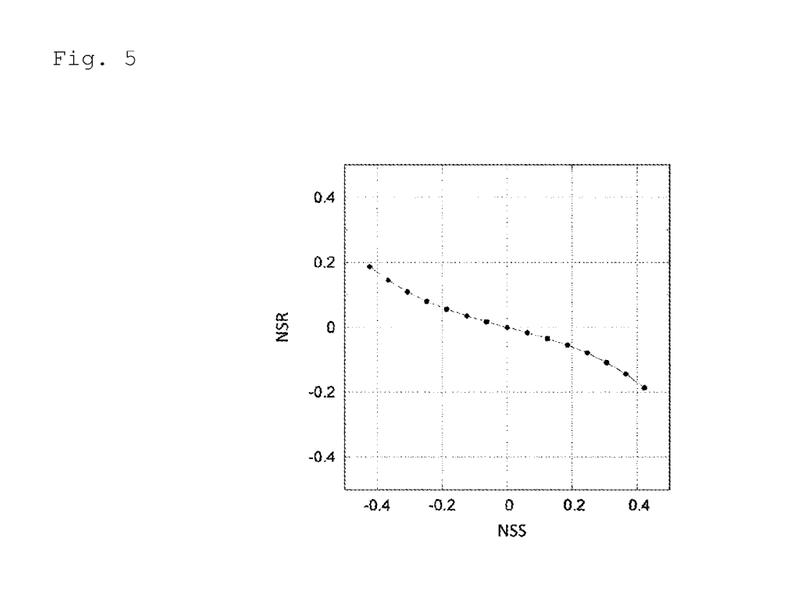
FIG. 5 is a characteristic diagram showing the result of plotting with NSR on a vertical axis and NSS on a horizontal axis.

FIG. 5 shows the result of plotting with the NSR on the vertical axis and the NSS on the horizontal axis. If the refractive index of the core 102b is 1.47 and the refractive index difference is 0.3%, the numerical aperture corresponding to $\theta_{max}$ is about 0.1. It is shown that if the NSS is about −0.35 to 0.35, the emitted light of the first optical waveguide 101 can propagate through the second optical waveguide 102 because the absolute value of the NSR is within 0.1 when it is incident on the second end surface 102a.

Next, a case will be described in which the optical axis 131 of the core 101b of the first optical waveguide 101, the optical axis 133 of the core 102b of the second optical waveguide 102, and the principal point 132 of the first lens 103 are coaxial with each other, and the principal point 134 of the second lens 104 deviates from the optical axis 133.

Figure 6:
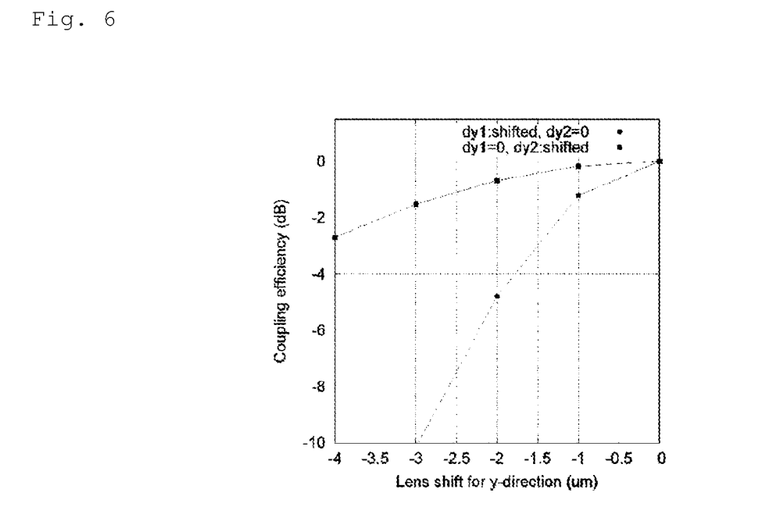
FIG. 6 is a characteristic diagram showing a coupling efficiency obtained when dy1 is changed while dy2=0 is satisfied and a coupling efficiency obtained when dy2 is changed while dy1=0 is satisfied.

FIG. 6 shows the coupling efficiency obtained when dy1 is changed while dy2=0 is satisfied (shifting the principal point 132 of the first lens 103) and the coupling efficiency obtained when dy2 is changed while dy1=0 is satisfied (shifting the principal point 134 of the second lens 104). The coupling efficiency indicates, in units of dB, a value obtained based on the overlap integral of the mode of distribution in the incident end surface of the second optical waveguide 102 when dy1=dy2=0 is satisfied, and the mode in the case where dy1 or dy2 is shifted.

Figure 7:
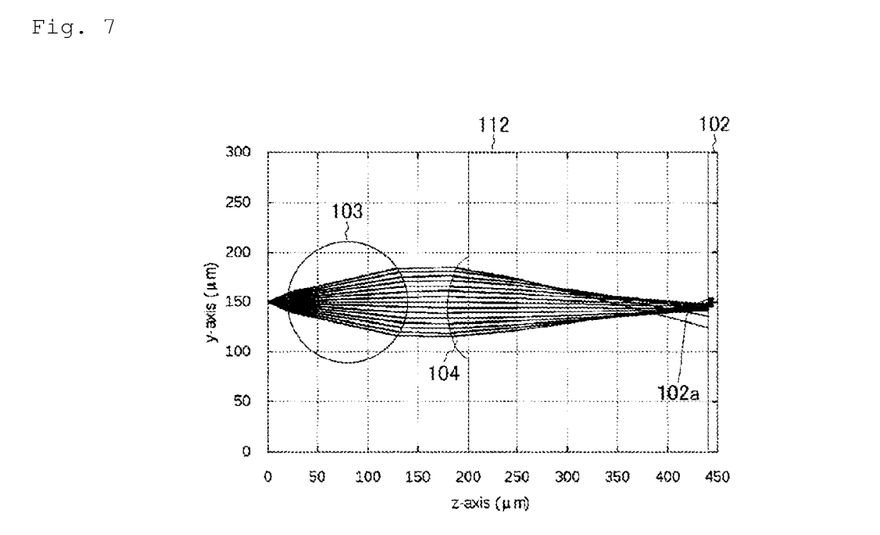
FIG. 7 is a characteristic diagram showing the result of performing optical path calculation of the y-coordinate (vertical axis) of the point image position with respect to the NSS (horizontal axis) in a state where dy1=0 and dy2=−5 µm are satisfied.

FIG. 7 shows the result of performing optical path calculation on the y-coordinate (vertical axis) of the point image position with respect to the NSS (horizontal axis) in a state where dy1=0 and dy2=−5 μm are satisfied. In this case, the point image position shifts downward overall, and therefore the coupling efficiency deteriorates.

Figure 8:
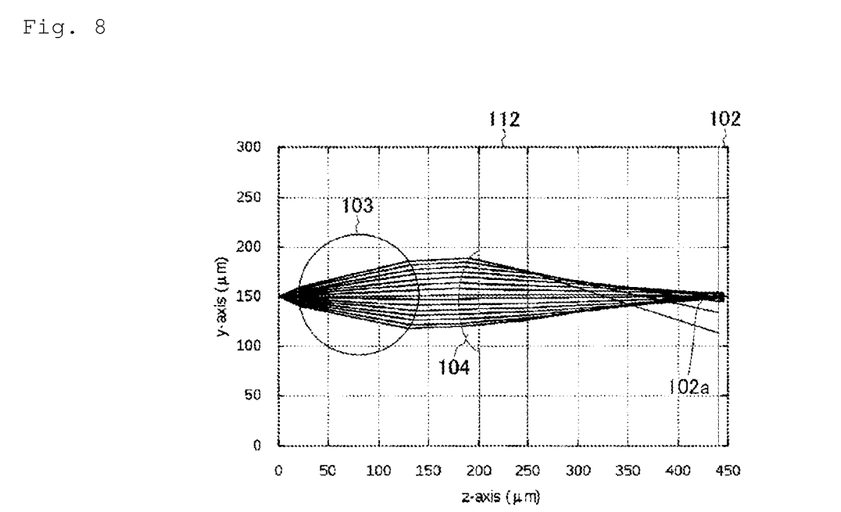
FIG. 8 is a characteristic diagram showing the result of performing optical path calculation in the same manner as in FIG. 3 in a state where dy1=+2.5 µm and dy2=−5 µm are satisfied.

FIG. 8 shows the result of performing optical path calculation in the same manner as in FIG. 3 in a state in which dy1=+2.5 μm and dy2=−5 μm are satisfied. By adjusting the position of the first lens 103 in the direction opposite to that of the second lens 104, the deviation of the point image position caused by the deviation of the second lens 104 is corrected. Since the coupling efficiency changes sensitively with respect to the shift amount of the first lens 103, the absolute value of dy1 is smaller than that of dy2. In other words, the positional relationship between the first lens 103 and the second lens 104 satisfies the following formulas.

$$dy1 \times dy2 < 0 \tag{1}$$

$$|dy1| < |dy2| \tag{2}$$

Figure 9:
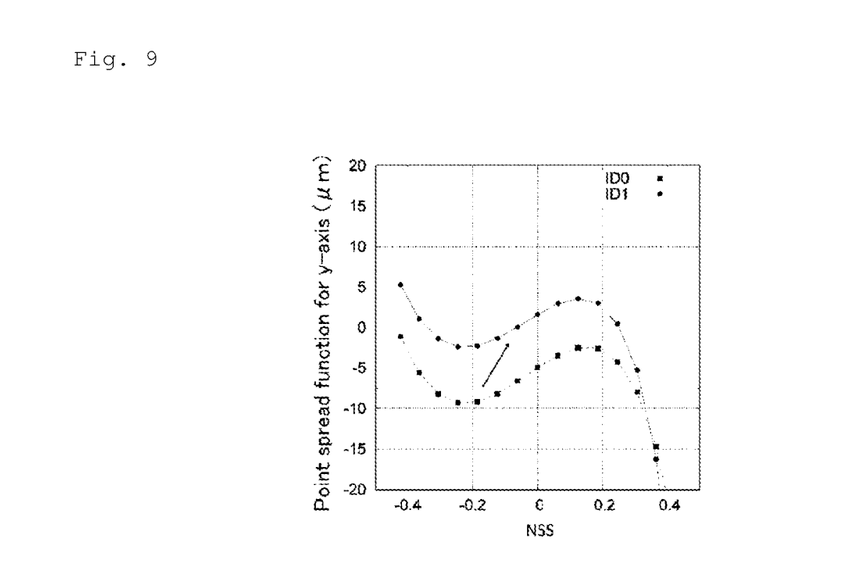
FIG. 9 is a characteristic diagram showing the result of plotting a point image position (y direction) that has been corrected through the position adjustment of the first lens 103, with respect to the NSS.

In FIG. 9, the point image position (y direction) corrected through the position adjustment of the first lens 103 is plotted with respect to the NSS. The dotted line ID0 corresponds to the case where the point image position deviates overall due to the deviation of the principal point of the second lens 104. By contrast, as shown by the solid line ID1, it can be understood that when the point image position is corrected by adjusting the position of the first lens 103, the light is focused toward the inside of the core 102b of the second optical waveguide 102.

Figure 10:
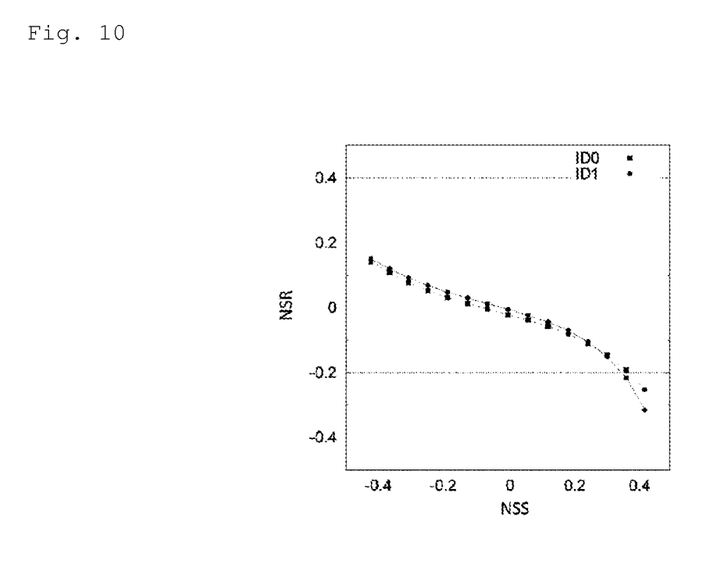
FIG. 10 is a characteristic diagram showing relationships between the NSS and the NSR before and after position adjustment of the first lens 103.

FIG. 10 shows relationships between the NSS and the NSR before and after the position adjustment of the first lens 103. The dotted line ID0 indicates a state before adjustment, and the solid line ID1 indicates a state after adjustment.

When the NSS is about −0.3 to 0.25, light can propagate in the second optical waveguide 102 with a numerical aperture of 0.1. In the first embodiment, the structure of the first lens 103 is rotationally symmetrical with respect to the axis passing through the principal point 132, which is parallel to the z-axis, and thus the point image position can be corrected by adjusting the position of the first lens 103 using the same principle also in the case where the deviation of the second lens 104 is in the x direction as shown in FIG. 2.

Embodiment 2

Figure 11:
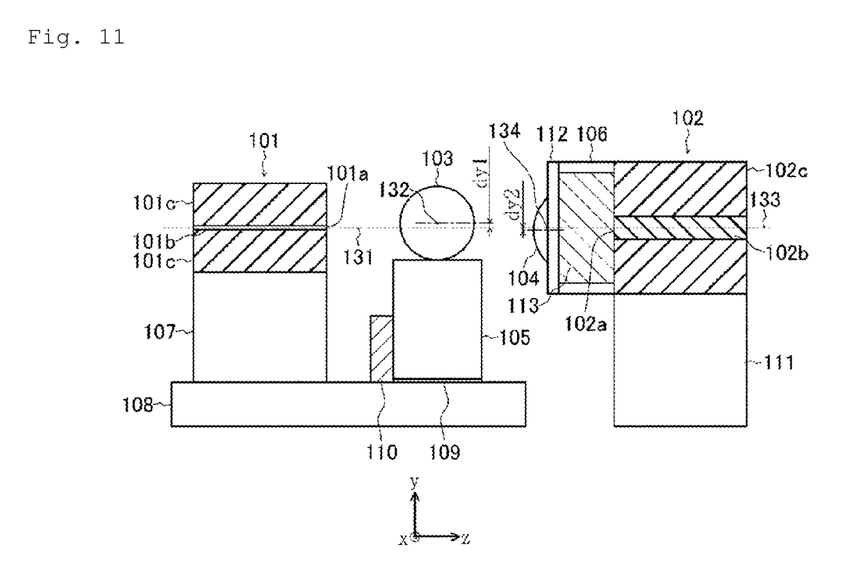
FIG. 11 is a cross-sectional view showing a configuration of an optical device according to a second embodiment of the present invention.

Next, the optical device according to the second embodiment of the present invention will be described with reference to FIG. 11. This optical device further includes a transparent resin layer 113 that is arranged so as to fill the region between the second lens 104 and the second end surface 102a in the optical device according to the first embodiment described above. For example, the region between the support plate 112 and the second end surface 102a inside the support portion 106 is filled with the transparent resin layer 113. By providing the transparent resin layer 113, the bonded state between the support portion 106 and the end surface of the second optical waveguide 102 is stabilized. For example, the refractive index of the transparent resin layer 113 can be less than or equal to the refractive index of the second lens 104 and the support plate 112. Also, it is desirable that the coefficient of thermal expansion of the transparent resin layer 113 is about the same as that of the support portion 106 and the support plate 112.

Figure 12:
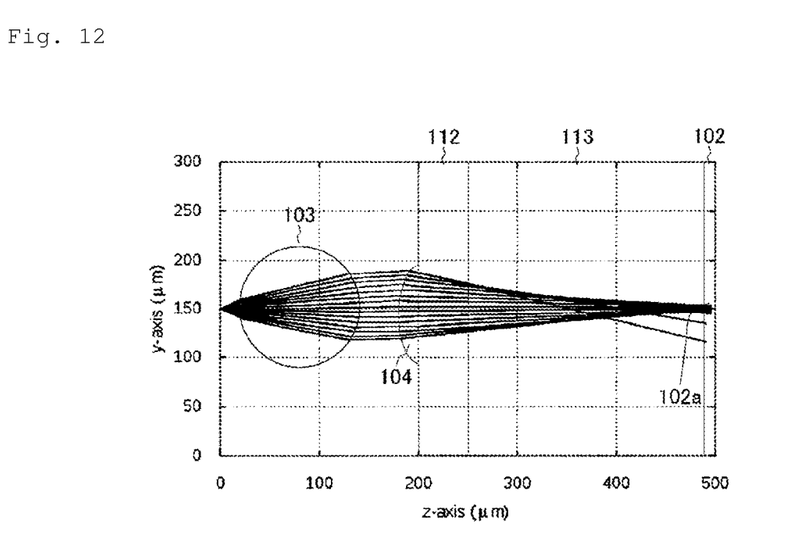
FIG. 12 is a characteristic diagram showing the result of performing optical path calculation with dy1=+2.5 µm and dy2=−5 µm set in the optical device according to the second embodiment.

Here, FIG. 12 shows the result of performing optical path calculation while dy1=+2.5 μm and dy2=−5 μm are satisfied in the optical device according to the second embodiment. The optical path length between the second lens 104 and the incident end surface of the second optical waveguide 102 is made longer than that in case where the transparent resin layer 113 is not provided, in order to focus light on the core 102b.

Figure 13:
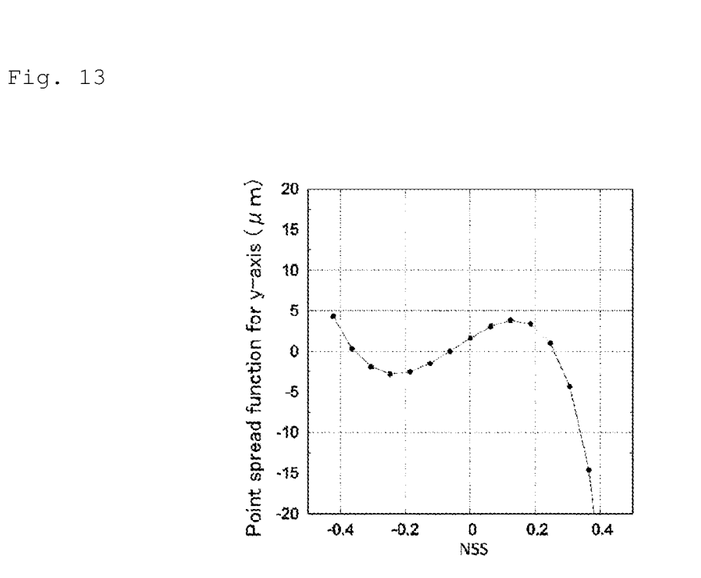
FIG. 13 is a characteristic diagram showing a relationship between the NSS and the point image position (y direction) after performing position adjustment using the first lens 103.
Figure 14:
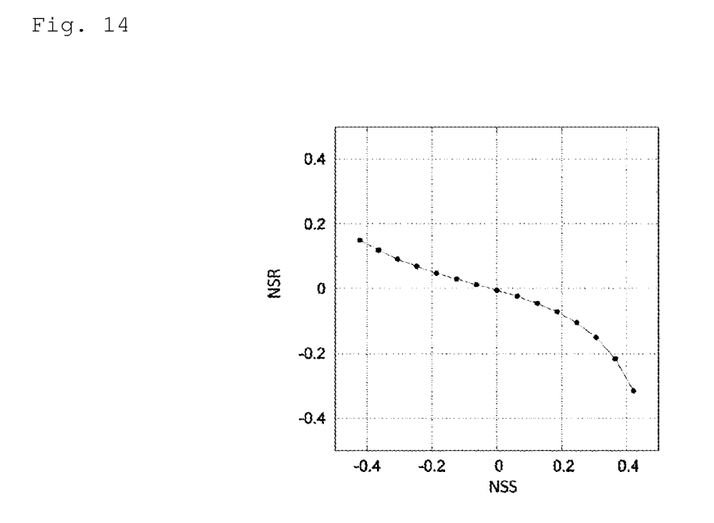
FIG. 14 is a characteristic diagram showing a relationship between the NSS and the NSR after position adjustment using the first lens 103.

Next, FIG. 13 shows a relationship between the NSS and the point image position (y direction) after the position adjustment performed using the first lens 103. Also, FIG. 14 shows the relationship between the NSS and the NSR after the position adjustment performed using the first lens 103. The effect of correcting the point image position through position adjustment using the first lens 103 can be obtained in the same manner as in the case where the transparent resin layer 113 is not provided.

Figure 15:
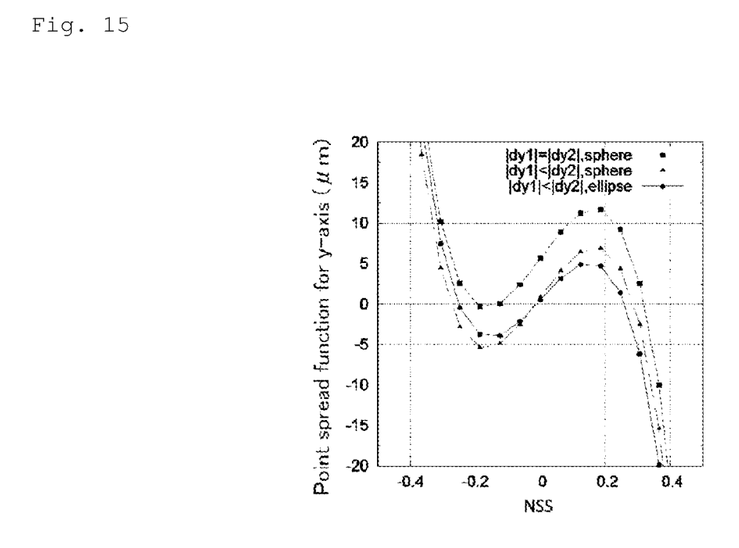
FIG. 15 is a characteristic diagram showing differences in point image position resulting from absolute values of a shift amount (dy1) at the principal point 132 of the first lens 103 and the shift amount (dy2) of the principal point 134 of the second lens 104 and the refracting surface (convex surface) shape of the second lens 104.

FIG. 15 shows differences in the point image position resulting from the absolute values of the shift amount (dy1) at the principal point 132 of the first lens 103 and the shift amount (dy2) of the principal point 134 of the second lens 104 and the refraction surface (convex surface) shape of the second lens 104. In FIG. 15, the horizontal axis is the NSS and the vertical axis is the point image position. In FIG. 15, the squares indicate a case where dy1=5.0 μm and dy2=−5.0 μm are satisfied, and the triangles indicate a case where dy1=3.2 μm and dy2=−5.0 μm are satisfied. Also, the refracting surface of the first lens 103 and the refracting surface of the second lens 104 are spherical surfaces having equal radii of curvature. It is assumed that a light ray that has passed through the first lens 103 has been converted into near-collimated light.

Based on the comparison between the squares and the triangles in FIG. 15, the effect of correcting deviation of the point image position is obtained more when the absolute value of the shift amount dy1 of the first lens 103 is smaller than that of the shift amount dy2 of the second lens 104 between spherical lenses having equal radii of curvature. However, unfocused light rays partially remain in the core 102b (−5 μm<y<5 μm).

Next, in FIG. 15, the circles indicate a case where, under the same conditions dy1=3.2 μm and dy2=−5.0 μm as the triangles, only the radius in the z direction of the second lens 104 has been increased by an appropriate amount, that is, the second lens 104 is an ellipsoidal lens in which the z direction is the major axis. Based on the comparison between the triangles and the circles, the light collection performance can be partially improved by making the refraction surface of the second lens 104 an ellipsoidal surface.

Hereinafter, the setting of the position of the adjustment platform 105 will be described. First, the profile of the shift amounts dx2 and dy2 of the principal point 134 of the second lens 104 is acquired in advance. This profile is referenced, and the position of the principal point 132 of the first lens 103 is calculated through optical path calculation.

The position of the adjustment platform 105 in the y direction is adjusted by controlling the thickness of the adhesive layer 109. The position of the adjustment platform 105 in the x direction is adjusted by moving the adjustment platform 105 in the x direction such that the x-coordinate of the principal point 132 of the first lens 103 matches the calculated position. The stopping member no fixed on the substrate 108 prevents the adjustment platform 105 from moving in the optical axis direction.

Figure 16:
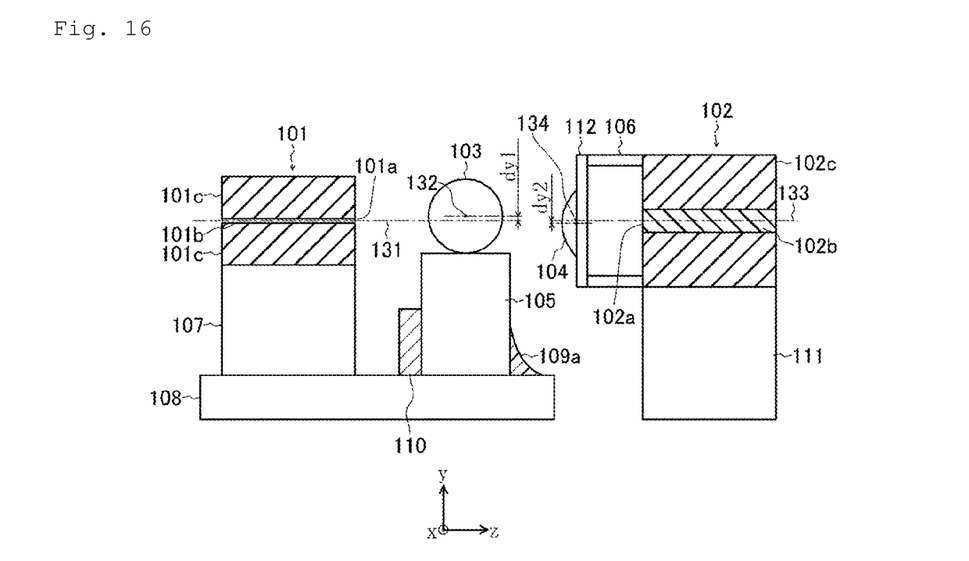
FIG. 16 is a cross-sectional view showing a configuration of another optical device according to the first embodiment of the present invention.

If the effect of cure shrinkage of the adhesive layer 109 cannot be ignored, the adjustment platform 105 is placed (arranged) directly on the substrate 108 without using the adhesive layer, as shown in FIG. 16. Also, the adjustment platform 105 is fixed using an adhesive portion 109a arranged so as to cover the side wall of the adjustment platform 105. In this case, the position of the adjustment platform 105 in the y direction is adjusted by preparing a plurality of adjustment platforms 105 having different heights and selecting the adjustment platform 105 according to which the principal point position of the first lens 103 is closest to the calculated position.

Note that the first optical waveguide can also be an optical waveguide constituted by a compound-based semiconductor, such as indium phosphide (InP), gallium nitride (GaN), and gallium arsenide (GaAs). Also, the second optical waveguide is not limited to an optical fiber, and can also be a planar light wave circuit. The same applies to the first optical waveguide as well.

Also, the first lens is not limited to a ball lens, and can also be a non-spherical lens. Also, the second lens is not limited to an ellipsoidal lens, and can also be another non-spherical lens such as a paraboloid or hyperboloid lens, or a spherical lens.

As described above, according to embodiments of the present invention, the adjustment platform on which the first lens is mounted and which is for adjusting the distance between the optical axis of the first optical waveguide and the principal point of the first lens on a plane orthogonal to the optical axis of the first optical waveguide is included, and therefore it is possible to correct a decrease in coupling efficiency caused by the principal point of the lens and the optical axis of the core of the optical waveguide not matching each other when the lens and the optical waveguide are formed in one piece, and it is possible to suppress a decrease in the coupling efficiency in an optical system using a plurality of lenses.

The present invention is not limited to the embodiments described above, and it is clear that many modifications and combinations can be carried out by a person having ordinary knowledge in the art, within the technical idea of the present invention.

REFERENCE SIGNS LIST

101 First optical waveguide
101a First end surface
101b Core
101c Cladding
102 Second optical waveguide
102a Second end surface
102b Core
102c Cladding
103 First lens
104 Second lens
105 Adjustment platform
106 Support portion
107 Mounting platform
108 Substrate
109 Adhesive layer
110 Stopping member
111 Mounting platform
112 Support plate
113 Transparent resin layer
131 Optical axis
132 Principal point
133 Optical axis
134 Principal point.

The invention claimed is:

1. An optical device comprising:
a first lens between a first end surface through which light of a first optical waveguide that is one connection target enters and exits, and a second end surface that faces the first end surface and through which light of a second optical waveguide that is another connection target enters and exits, the first lens being configured to enlarge a diameter of a mode field of light that is guided through the first optical waveguide and is emitted from the first end surface;
a second lens between the first lens and the second end surface, the second lens being configured to collect light that has passed through the first lens;
an adjustment platform on which the first lens is mounted and configured to position the first lens such that a distance between an optical axis of the first optical waveguide and a principal point of the first lens on a plane orthogonal to the optical axis of the first optical waveguide is maintained, wherein the distance is determined in accordance with a coupling efficiency between the first optical waveguide and the first lens; and
a support portion configured to support the second lens on a second end surface side of the second optical waveguide.

2. The optical device according to claim 1, further comprising:
a mounting platform attached to a substrate, wherein the first optical waveguide is disposed on the mounting platform; and
an adhesive layer attaching the adjustment platform to the substrate.

3. The optical device according to claim 2, wherein a thickness of the adhesive layer is selected in accordance with the coupling efficiency between the first optical waveguide and the first lens.

4. The optical device according to claim 2 further comprising a stopping member on the substrate between the mounting platform and the adjustment platform, wherein the stopping member is configured to limit movement of the adjustment platform along the optical axis of the first optical waveguide.

5. The optical device according to claim 1, wherein the first lens is a ball lens.

6. The optical device according to claim 1, further comprising a transparent resin layer filling a region between the second lens and the second end surface.

7. The optical device according to claim 1, wherein the second lens is configured to collect light that has passed through the first lens in order to couple light that is guided through the first optical waveguide and is emitted from the first end surface to the second optical waveguide at the second end surface.

8. The optical device according to claim 1, wherein a first distance between the optical axis of the first optical waveguide and a principal point of the first lens is in a range in which, with respect to a second distance between an optical axis of the second optical waveguide and a principal point of the second lens, $d1 \times d2 < 0$ and $|d1| < |d2|$ are satisfied, wherein d1 is the first distance and d2 is the second distance.

9. An optical device comprising:
a first lens between a first end surface of a first optical waveguide and a second end surface of a second optical waveguide, the first lens being configured to enlarge a diameter of a mode field of light that is guided through the first optical waveguide and is emitted from the first end surface;
a second lens between the first lens and the second end surface, the second lens being configured to collect light that has passed through the first lens; and
an adjustment platform on which the first lens is mounted and configured to position the first lens such that a distance between an optical axis of the first optical waveguide and a principal point of the first lens on a plane orthogonal to the optical axis of the first optical waveguide is maintained, wherein the distance is determined in accordance with a coupling efficiency between the first optical waveguide and the first lens.

10. The optical device according to claim 9, further comprising:
a mounting platform attached to a substrate, wherein the first optical waveguide is disposed on the mounting platform; and
an adhesive layer attaching the adjustment platform to the substrate.

11. The optical device according to claim 10, wherein a thickness of the adhesive layer is selected in accordance with the coupling efficiency between the first optical waveguide and the first lens.

12. The optical device according to claim 10 further comprising a stopping member on the substrate between the mounting platform and the adjustment platform, wherein the stopping member is configured to limit movement of the adjustment platform along the optical axis of the first optical waveguide.

13. The optical device according to claim 9, wherein the second lens is configured to collect light that has passed through the first lens in order to couple light that is guided through the first optical waveguide and is emitted from the first end surface to the second optical waveguide at the second end surface.

14. The optical device according to claim 9, wherein a first distance between the optical axis of the first optical waveguide and a principal point of the first lens is in a range in which, with respect to a second distance between an optical axis of the second optical waveguide and a principal point of the second lens, $d1 \times d2 < 0$ and $|d1| < |d2|$ are satisfied, wherein d1 is the first distance and d2 is the second distance.

15. The optical device according to claim 9, wherein the first lens is a ball lens.

16. The optical device according to claim 15, further comprising a transparent resin layer filling a region between the second lens and the second end surface.

17. The optical device according to claim 9, further comprising:
   a support portion configured to support the second lens on a side of the second optical waveguide corresponding to the second end surface.

* * * * *